March 22, 1960   J. W. WIGERT ET AL   2,930,011
TRANSFORMERS WITH MOLDED CONTAINERS
Filed Nov. 22, 1957   2 Sheets-Sheet 1

WITNESSES

INVENTORS
John W. Wigert &
Charles F. Scholz
BY
ATTORNEY

United States Patent Office
2,930,011
Patented Mar. 22, 1960

2,930,011
TRANSFORMERS WITH MOLDED CONTAINERS

John W. Wigert, Berea, and Charles F. Scholz, Maple Heights, Ohio, assignors to Westinghouse Electric Corporation, East Pittsburgh, Pa., a corporation of Pennsylvania Application November 22, 1957, Serial No. 698,186

8 Claims. (Cl. 336—96)

The invention relates generally to transformers and more particularly to transformers provided with cast or molded containers or cases.

The object of the invention is to provide a molded transformer encased in an inert material bonded to provide a tough, somewhat resilient case capable of resisting shocks and weather.

It is also an object of the invention to provide a case for transformers having high dielectric strength and capacity to conduct and dissipate the heat generated by the transformer.

Other objects of the invention will in part be obvious and will in part appear hereinafter.

The invention accordingly comprises an article of manufacture possessing the features, properties and the relation of elements which will be exemplified in the article hereinafter described, and the scope of the application of which will be indicated in the claims.

For a fuller understanding of the nature and objects of the invention, reference should be had to the following detailed description taken in connection with the accompanying drawing, in which.

Electrical apparatus with the present cast or molded cases can within limits be made to conform to various installation requirements as to shape and dimensions. Further, the materials from which the case is molded may be so selected that the case will have high insulation value, long life in atmospheres generally known to be highly corrosive, and high resistance to damage by shock.

Figure 1:
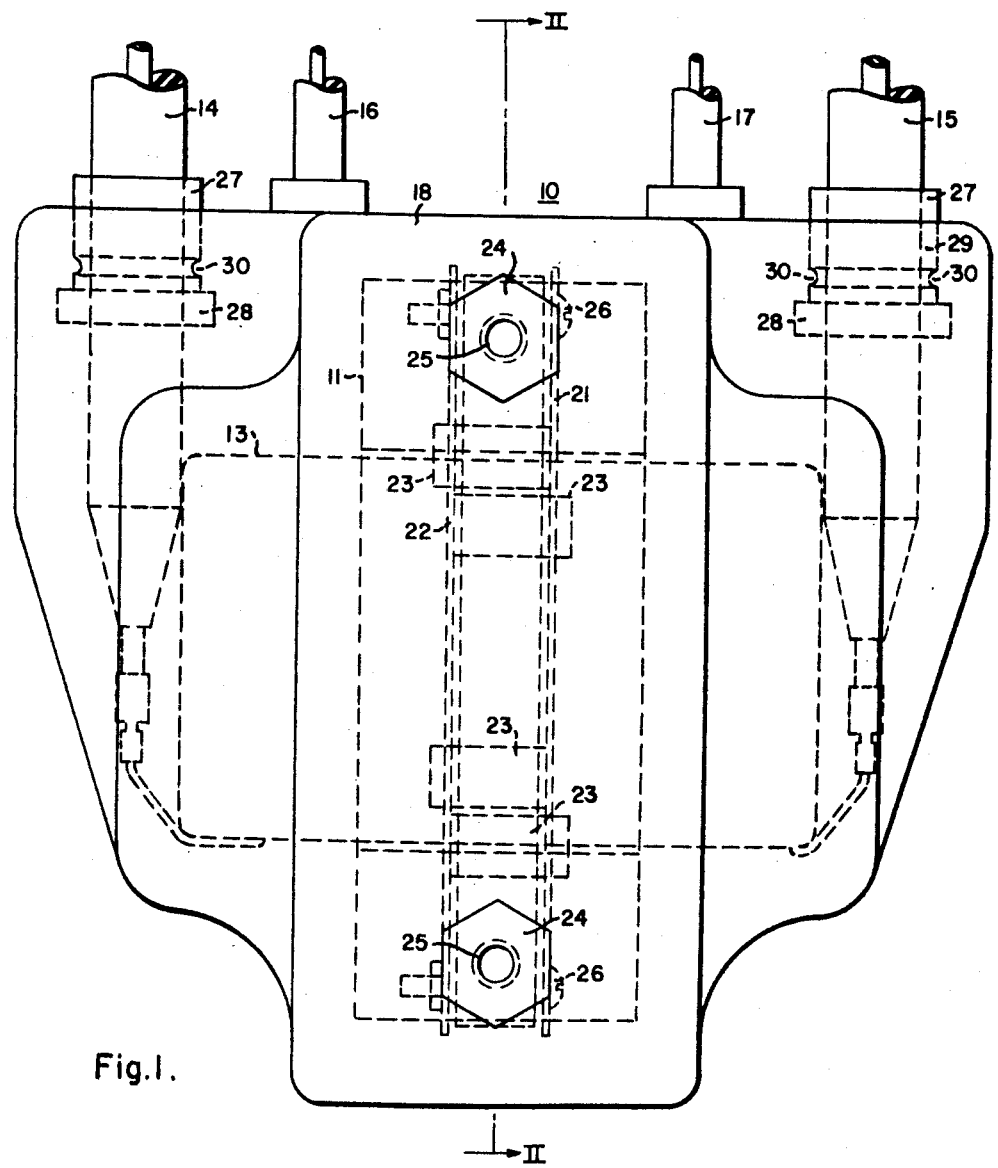
Figure 1 is a view in side elevation of a transformer embodying the features of the invention.

Referring now to Fig. 1 in particular, the transformer shown generally at 10 is molded in a predetermined shape roughly corresponding to the slope of the core and coils, modified to some extent, for example, by mounting requirements. The molding to a predetermined shape can only be practiced within predetermined limits. The core 11 and the low and high voltage windings or coils 12 and 13, respectively, must of necessity be made of adequate size to have the capacity desired. However, once the size of the core and coils has been determined, then the high voltage terminals 14 and 15, and the low voltage terminals 16 and 17, best shown in Fig. 1, may be located as desired, and the case 18 molded around the core and coils to support the terminals or leads in any predetermined position. In this modification of the invention as shown in Fig. 1, the leads are all brought out on one side of the transformer case.

In this embodiment of the invention, a wound core 11 is employed; however, it is to be understood that other cores may be encased as readily. It is the common practice in the wound core to provide a strap 19 for holding the core sections in the proper relative positions. The coils 12 and 13 are usually preformed and the core 11 assembled around them.

In order to mount the core on the preformed coils, one practice is to make it in the two parts as shown in Patent 2,293,951, issued August 25, 1942. When the sections of the core 11 have been fitted around the windings 12 and 13, the strap 19 is applied and it holds the parts of the core in position.

In assembling the preformed coils 12 and 13, a plurality of spacers 20 are disposed between the coils to keep them properly spaced from one another. These spacers 20 will be made of some well known insulating material and be of adequate thickness to keep the coils so spaced as to prevent electrical breakdown between the coils. Usually about four spacers are adequate, but any suitable number may be supplied to meet conditions. Other spacers such as the well known corrugated paper or even crepe paper may be employed when a number of layers are applied to give the proper thickness to space the coils.

It is usual when the core and coils have been assembled to apply some suitable means for mounting or supporting the transformer in the installation for which it has been designed. In this particular embodiment of the invention, a wound core is illustrated, the parts of which are held in position by the strap 19. Referring now to Fig. 1, the support illustrated comprises two spaced parallel plates 21 and 22. One side of each plate is straight and the other side is cut to conform generally to the contour of the adjacent side of the wound core as shown by dotted outline in Fig. 2. Thus at the ends of the plates we have projections, the inner faces of which conform to the curvature of the corners of the core. Extending at substantially right angles to each plate are two laterally extending arms or smaller plates 23. These arms 23 are usually formed integral with the side plates 21 and 22, respectively, and turned to extend at right angles thereto.

Disposed between the ends of the plates 21 and 22 are bosses 24. These bosses are provided with threaded openings as shown at 25 to receive threaded members or screw bolts which may be utilized for supporting the transformer. The ends of the bosses next to the transformer will be so cut at an angle (Fig. 2) that they do not project below the curved edges of plates 21 and 22. In order to hold the bosses 24 in position, openings are drilled in the plates 21 and 22 and through the bosses 24 to receive bolts 26 which are employed to clamp the plates to the bosses.

In mounting the supporting structure on the transformer, the plates 21 and 22 are separated and the arms 23 fitted under the strap 19. The plates are then moved toward one another and clamped together on the bosses 24 by means of the bolts 26. Since the plates have been cut to conform to the shape of the core 11 and are held firmly against the core by means of the arms 23 engaging under the strap 19, a fairly rigid structure is provided for supporting the transformer. The supporting structure described hereinbefore will be more firmly attached to the core and coils during the molding operation to be described hereinafter.

In making the transformer, after the supporting means has been applied, the leads or terminals 14 to 17 inclusive will be located to suit the installation to be made. As shown in Fig. 1, in this modification of the invention the leads 14 to 17 inclusive are disposed in a vertical position so that access may be had to them for making connections at the top of the transformer. The leads 14 to 17 each have insulating coverings, for example of rubber or the like.

In order to provide for a thoroughly sealed transformer, grommets 27 are fitted over and vulcanized to or molded on or otherwise securely sealed on each of the leads 14 to 17 inclusive. These grommets should be made of some suitable composition capable of withstanding some stretching and shocks of all kind and also the conditions under which the transformer is to be used. A good grade of rubber or material having similar characteristics has been found to be quite satisfactory for making the grommets. As shown, each grommet is provided with an integral flange 28 which is embedded in the mass of inert material molded into the case to be described hereinafter. The small end of the grommet 27 extends a distance beyond the surface of the case to give some flexibility to the connection. The body 29 of the grommet will be anywhere from 1 to 2 inches in length depending to some extent on the size of the transformer and the thickness of the case to be applied. Each grommet is provided with a circumferential groove 30 to make a better seal for the resinous impregnant with which the material to be applied to form the case is impregnated. In applying the grommets to the leads, a tight fit will be made. It may be desirable to mold or vulcanize the grommet 27 to the lead insulation covering.

When the elements of the transformer have been arranged as described hereinbefore, the whole structure will be placed in a mold shown and described in our copending application Serial No. 698,180, filed November 22, 1957. The transformer structure will have to be supported in spaced relationship to the mold and this can be effected in a number of ways. It is good practice to utilize the bosses 24 described hereinbefore for supporting the transformer in proper position in the mold.

In applying the case, finely divided inert material of about 20 mesh up to 12 mesh is poured into the mold to completely envelop the core, coils and the leads to a point near the small end of the grommets 27. In order to completely envelop the transformer and fill all cavities in the core and coil structure, the mold is vibrated as sand or other filler is poured into it. Therefore, when the operation is completed the transformer structure and the support are completely enveloped in a mass of inert material with the exception of the threaded openings 25 provided in the bosses 24.

There are many inert materials that are suitable for use in encasing or applying a case to a transformer core and coil structure. Experimentation has revealed that ordinary silica sand, alumina, talc, calcium carbonate, and mica or combinations of these in various proportions are all quite satisfactory. Ordinary silica sand processed and cleaned costs around 2 cents a pound. It is a very durable material and can readily be prepared of the proper fineness. Consequently, it has been employed with considerable success.

The mass of finely divided inert material enveloping the transformer should have high electrical insulating value and adequate capacity for conducting heat to enable it to dissipate the heat generated by the transformer when in service. It has been found that in employing any of the finely divided inert materials described hereinbefore, that if they are so packed that adjacent particles of the inert material are in intimate or firm contact with one another, their heat conducting capacity is much higher than when they are applied around the core and coils in a relatively loose arrangement. When the particles of inert material have been properly packed and then impregnated, the impregnant or resin will hold the particles in their as packed positions. Further, the mass of inert material may be applied to the core and coils in the proper thickness to provide the insulation value required to meet the conditions of the service in which the transformer will be employed. The thickness of the transformer case may have to be varied somewhat depending on the inert materials selected for molding the case.

After the mold has been filled to a predetermined level and vibrated until all the cavities or spaces in the transformer structure have been completely filled, a resin is flowed into the inert mass of material. This resin will be flowed into the mass of inert material in accordance with the practices disclosed in our copending application referred to hereinbefore.

It has been found that there are many resins which are suitable for bonding the mass of inert material into a slightly resilient shock resistant mass which serves as an excellent case for the transformer. Resins which have been found suitable are epoxy resins, polyester modified epoxy resins, and polyesters. These resins have been selected from the many resins that could be used because of their relaitvely long pot life and short cure time.

In order to accelerate the process of bonding the finely processed mass of inert material, accelerators or catalysts may be added to the resin. A number of catalysts have been found to be satisfactory. In practicing the invention, hexahydrophthalic anhydride, hexachloroendomethylenetetrahydrophthalic anhydride and phthalic anhydride have been used with success. These accelerators will be introduced into the resin at the proper time.

In some instances it may be desirable to introduce pigments into the resin to give the molded case the desired color. The selection of the pigment will be guided by its heat emissivity. The transformer case must conduct heat to the surface and dissipate it and the pigments employed must not greatly impede the dissipation of heat and thereby lower the capacity of the transformer. When a transformer is to be utilized exposed to sunlight the pigment should have the required surface reflectivity. Pigments may also be selected to give the surface of the transformer case a certain opacity to meet some service conditions. Generally, the use of pigments in the resin so conditions the surface of the case that it is more resistant to weathering than when pigments are not employed.

It has also been found that it may be desirable to introduce fillers into the resin. These fillers will be made of the same materials employed for encasing the transformer. The introduction of the resin into the mass of inert material, the introduction of the pigments for giving color and the procedure to be employed in preparing the transformer and mass of inert material to receive the resins and the functioning of the accelerator or catalyst are all described in greater detail in our copending application referred to hereinbefore.

After the mass of inert material has been properly impregnated, the mold and its contents will be subjected to about 100° C. in an oven to accelerate the polymerization process. When the polymerization process has advanced far enough to convert the mass of material to a substantially solid state, the mold will be stripped off and the baking procedure continued until the resin impregnated inert material has been completely cured, giving a slightly resilient mass capable of withstanding shocks and weather.

When the polymerization has been completed the bosses 24 which are now embedded in the case formed by the resin treated inert mass are firmly bonded or linked with the transformer and can be utilized to support it in any installation.

Figure 2:
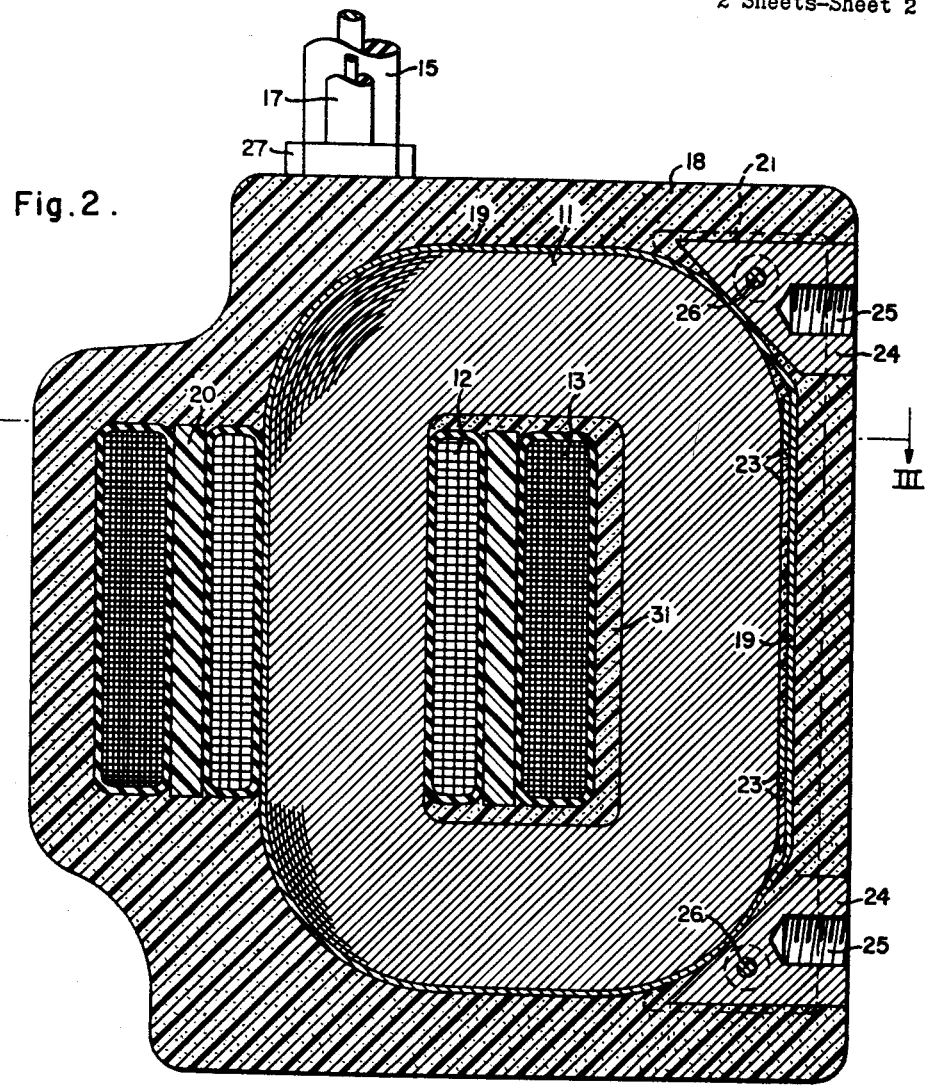
Fig. 2 is a view in section taken along the line II—II of Fig. 1.
Figure 3:
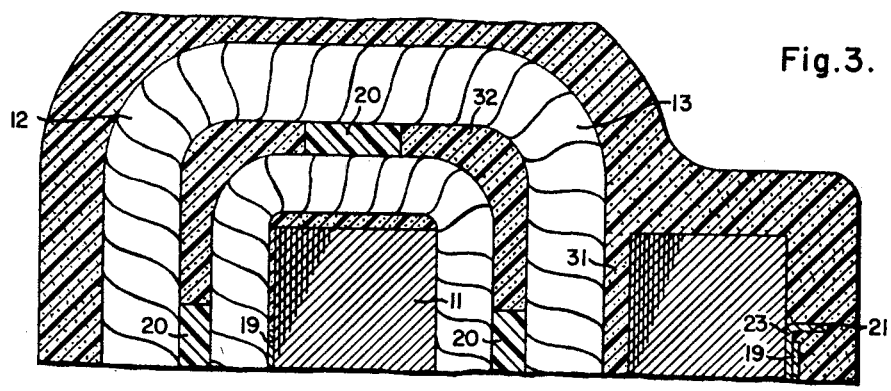
Fig. 3 is a partial view in section taken along line III—III of Fig. 2.

Referring now to Figs. 2 and 3, it will be observed that the resin impregnated inert material has formed a layer between the high voltage coil 13 and the core 11 as shown at 31. The impregnated inert mass also fills the spaces between the spacers 20 located between the coils 12 and 13 as shown at 32 and between the coils and core 11. The final product will now be a core and coil assembly having all the spaces therein completely filled with a mass of inert material the particles of which have been firmly bonded by a polymerized resinous material. If a pigment has been mixed into the impregnant the article of manufacture will have the color desired.

The thickness of the enveloping mass of the case 18 will depend on the conditions to be met. In certain transformers produced, the case 18 was made about ⅝ of an inch thick. Tests reveal that a case made of sand impregnated with resin catalyzed with hexahydrophthalic anhydride as one of the accelerators disclosed withstood over 22,000 volts without failure. This demonstrates its excellent insulating characteristics. Further, it was found that the case will effectively transmit and dissipate the heat generated in the transformer. It has been also found that by proper design and the making of the case of proper thickness, nearly any desired dielectric strength may be obtained. When the inert material has been properly processed and impregnated the quality of the final material in the case will be uniform and homogeneous throughout.

Since certain changes may be made in the above article and different embodiments of the invention could be made without departing from the scope thereof, it is intended that all matter contained in the above description or shown in the accompanying drawing shall be interpreted as illustrative and not in a limiting sense.

Accordingly, what is claimed as new is:

1. A transformer comprising, a core of magnetic material having high and low voltage windings thereon, a structural casing providing both support and electrical insulation for said core and coils comprising a uniform mass of particles of an electrical insulating and heat conducting material substantially completely surrounding and in intimate contact with said core and windings, the particles of said material being in intimate contact with each other, and the interstices between the mass of the particles and the spaces in the core and windings being filled with a thermoset resinous material.

2. A transformer comprising, a core of magnetic material having high and low voltage windings thereon, a structural casing providing both support and electrical insulation for said core and coils comprising a uniform mass of particles of an electrical insulating and heat conducting material substantially completely surrounding and in intimate contact with said core and windings, the particles of said material being in intimate contact with each other, and the interstices between the mass of particles and the spaces in the core and windings being filled with a thermoset resinous material, and support means for the transformer secured to said core and extending through said casing to be additionally supported thereby to the exterior thereof.

3. A transformer comprising, a core of magnetic material having high and low voltage windings thereon, a structural casing providing both support and electrical insulation for said core and coils comprising a uniform mass of particles of an electrical insulating and heat conducting material substantially completely surrounding and in intimate contact with said core and windings, the particles of said material being in intimate contact with each other, and the interstices between the mass of particles and the spaces in the core and windings being filled with a thermoset resinous material, electrical leads extending from said coils through the casing to the exterior thereof, and resilient means about each of said leads at the outer surface of said casing and extending a substantial distance into the casing to be embedded therein and supported thereby.

4. A transformer comprising in combination, a core, a high voltage and low voltage coil disposed cooperatively about said core and about each other, spacers disposed between said high and low voltage coils to provide a predetermined space therebetween, a body of substantial thickness disposed completely about the core and coils, said body comprising solid inert, inorganic particles having an average particle size within the range of about 20 mesh to 12 mesh closely packed and in intimate contact with each other and about and between said core, high voltage and low voltage coils and spacers, and thermoset resin disposed in and filling the interstices between the particles of said inert, inorganic particles, said body of inert, inorganic, particles with the applied thermoset resin electrically insulating said core and said coils from each other, providing mechanical support to said core and said coils, and providing good dissipation of heat as it develops in service.

5. A transformer comprising in combination, a core, a high voltage and low voltage coil disposed cooperatively about said core and about each other, spacers disposed between said high and low voltage coil to provide a predetermined space therebetween, a body of coarse solid, inert, inorganic particles comprised of at least one material selected from the group consisting of silica, alumina, talc, calcium carbonate and mica packed in intimate contact about and between said core, high voltage and low voltage coils, and spacers, and a body of thermoset resin disposed in and filling the interstices between the particles of said inert, inorganic material, the thermoset resin being selected from at least one of the group consisting of epoxy resin, epoxy modified polyester resin and polyester resin, said body of inert, inorganic material with its applied thermoset resin electrically insulating said core and said coils from each other, providing mechanical support to said core and said coils and providing good dissipation of heat as it develops in service.

6. A transformer comprising in combination, a core, a high voltage and low voltage coil disposed cooperatively about said core and about each other, leads provided on the high voltage and low voltage coils, spacers disposed between said high and low voltage coils to provide a predetermined space therebetween, a body of solid, inert, inorganic particles comprised of at least one material selected from the group consisting of silicia, alumina, talc, calcium carbonate and mica and having an average particle size within the range of about 20 mesh to 12 mesh packed in intimate contact about and between said core, high voltage and low voltage coils, coil leads and spacers, and a body of thermoset resin disposed in and filling the interstices between the particles of said inert, inorganic material, the thermoset resin being selected from at least one of the group consisting of epoxy resin, epoxy modified polyester resin and polyester resin, said body of inert, inorganic material with the applied thermoset resin electrically insulating said core, coils and coil leads from each other, providing mechanical support to said core, coils and coil leads and providing good dissipation of heat as it develops in service.

7. A transformer comprising in combination, a core, a high voltage and low voltage coil disposed cooperatively about said core and about each other, leads provided on the high voltage and low voltage coils, spacers disposed between said high and low voltage coils to provide a predetermined space therebetween, means disposed upon the core for mounting the transformer, a body of coarse solid, inert, inorganic particles comprised of at least one material selected from the group consisting of silica, alumina, talc, calcium carbonate and mica packed in intimate contact about and between said core, high voltage and low voltage coils, coil leads, spacers, and mounting means, and a body of thermoset resin disposed in and filling the interstices between the particles of said inert, inorganic material, the thermoset resin being selected from at least one of the group consisting of epoxy resin, epoxy modified polyester resin, and polyester resin, said body of inert, inorganic material with the applied thermoset resin electrically insulating said core, coils and coil leads from each other providing mechanical support to said core, coils, coil leads and mounting means and providing good dissipation of heat as it develops in service.

8. A transformer comprising in combination, a core, a high voltage and low voltage coil disposed cooperatively about said core and about each other, leads provided on the high voltage and low voltage coils, a grommet having an enlarged portion comprised of a resilient elastomeric material disposed about at least a portion of each said leads, spacers disposed between said high and low voltage coils to provide a predetermined space therebetween, means disposed upon the core for mounting the transformer, a body of coarse solid, inert, inorganic particles comprised of at least one material selected from the group consisting of silica, alumina, talc, calcium carbonate and mica packed in intimate contact about and between said core, high voltage and low voltage coils, coil leads, the enlarged portion of each grommet, spacers and mounting means, and a body of thermoset resin disposed in and filling the interstices between the particles of said inert, inorganic material, the thermoset resin being selected from at least one of the group consisting of epoxy resin, epoxy modified polyester resin, and polyester resin, said body of inert, inorganic material with its thermoset resin electrically insulating said core, coils and coil leads from each other, providing mechanical support to said core, coils, coil leads, grommets and mounting means, and providing good dissipation of heat as it develops in service.

References Cited in the file of this patent

UNITED STATES PATENTS

| | | |
|---|---|---|
| 2,297,605 | Camilli | Sept. 29, 1942 |
| 2,795,009 | Gosnell | June 11, 1957 |

FOREIGN PATENTS

| | | |
|---|---|---|
| 690,125 | Great Britain | Apr. 15, 1953 |

OTHER REFERENCES

Electronics Magazine, June 1950, pp. 66–69.